United States Patent [19]

Oakley et al.

[11] Patent Number: 5,893,986
[45] Date of Patent: Apr. 13, 1999

[54] METHOD OF CONTROLLING A PLASMA ARC CUTTING TORCH

[75] Inventors: Thomas Franklin Oakley; Joseph Valerious Warren, Jr., both of Florence, S.C.

[73] Assignee: The ESAB Group, Inc., Florence, S.C.

[21] Appl. No.: 08/843,045

[22] Filed: Apr. 11, 1997

[51] Int. Cl.$^6$ ..................................... B23K 10/00
[52] U.S. Cl. ........................ 219/121.59; 219/121.39; 219/121.44; 219/121.54
[58] Field of Search .................... 219/121.39, 121.44, 219/121.59, 121.54, 121.57, 137 R, 121.48

[56] References Cited

U.S. PATENT DOCUMENTS

| | | |
|---|---|---|
| 3,646,311 | 2/1972 | Cameron et al. . |
| 4,049,942 | 9/1977 | Balleys et al. . |
| 4,156,125 | 5/1979 | Brown . |
| 4,195,216 | 3/1980 | Beauchamp et al. . |
| 4,578,562 | 3/1986 | Lindstrom et al. . |
| 4,788,409 | 11/1988 | Yamade et al. . |
| 4,885,455 | 12/1989 | Schultz et al. . |
| 4,901,253 | 2/1990 | Iwano et al. ............... 364/522 |
| 4,918,283 | 4/1990 | Yamade et al. . |
| 5,036,176 | 7/1991 | Yamaguchi et al. . |
| 5,043,554 | 8/1991 | Kohsaka et al. ............ 219/121.39 |
| 5,225,654 | 7/1993 | Harwig et al. . |
| 5,414,237 | 5/1995 | Carkhuff . |
| 5,506,384 | 4/1996 | Yamaguchi . |
| 5,506,387 | 4/1996 | Sawada et al. . |
| 5,521,350 | 5/1996 | Nishi et al. . |

*Primary Examiner*—Mark Paschall
*Attorney, Agent, or Firm*—Alston & Bird LLP

[57] ABSTRACT

A method of controlling a plasma arc torch in cutting or marking a workpiece along a path of travel having a starting point and stopping point in accordance with a predetermined program and in which an arc extinguish order in issued at a predetermined point or location on the path of travel spaced upstream of the stopping point a distance determined by the speed or velocity of the torch and the arc extinguish delay time between issuance of the arc extinguish order and actual extinguishment of the arc so that the arc is extinguished at the precise instant the torch arrives at the stopping point.

6 Claims, 1 Drawing Sheet

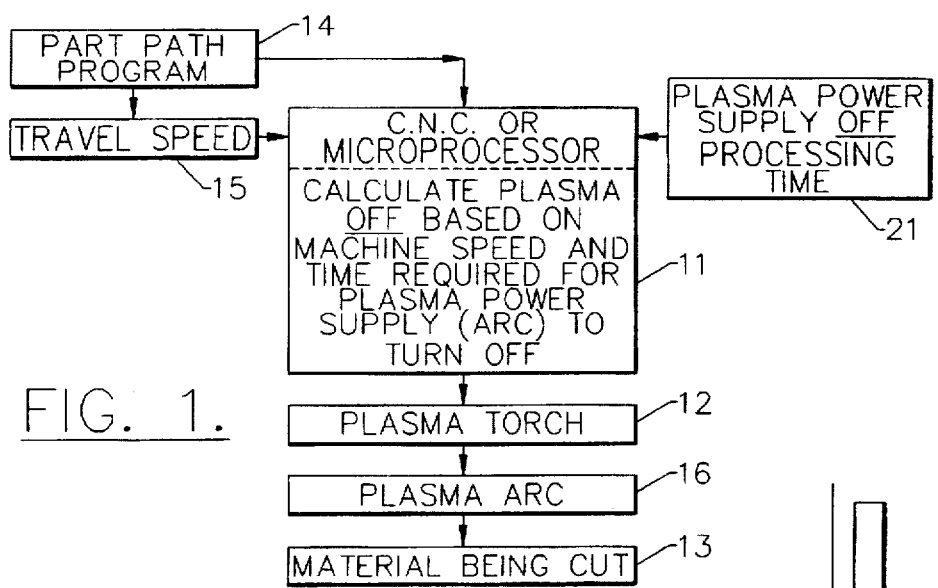
FIG. 1.
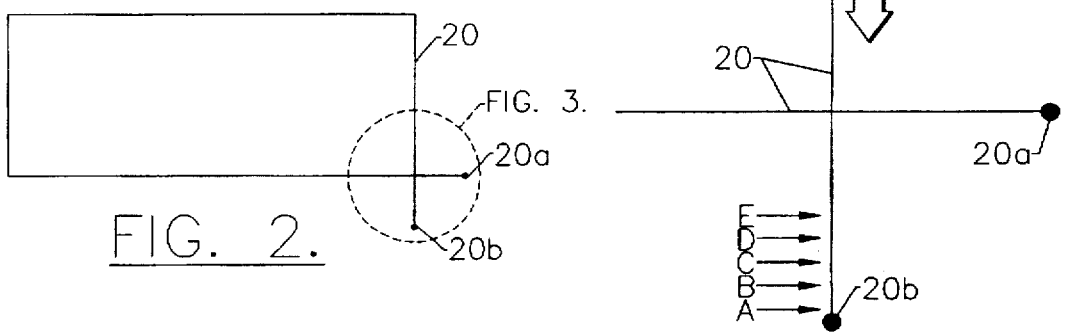
FIG. 2.
FIG. 3.
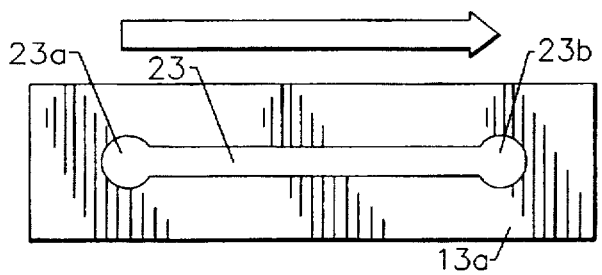
FIG. 4.
(PRIOR ART)
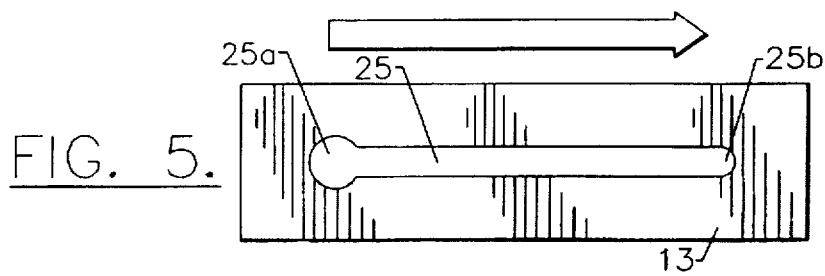
FIG. 5.

METHOD OF CONTROLLING A PLASMA ARC CUTTING TORCH

FIELD OF THE INVENTION

The present invention relates to plasma arc cutting torches and more particularly to a method of controlling such torches.

BACKGROUND OF THE INVENTION

The use of plasma arc torches to cut workpieces is well-known. It is also known to provide control systems for such plasma arc torches which control the operation of the torches such that the torches establish an arc between the torch and the workpiece at a starting point, move along a predetermined path of travel in accordance with the pattern in which the workpiece is to be cut, and stop such movement at a stopping point and extinguish the arc. In such control systems, the order to extinguish the arc is not issued by the control system program until the torch has reached the stopping point and ceased its movement. During the time delay between issuance of the extinguish order and actual extinguishment of the arc, there usually is a voltage increase which results in waste of electrode material and other undesirable effects.

Plasma arc torches may also be used to mark, but not cut, workpieces by forming a shallow groove in the surface of the workpiece. With previous control systems, plasma arc torches could not be used effectively for precision marking because the torches were not extinguished at the precise end or stopping point of the marking and formed a deeper dimple or hole at the end of the marking.

SUMMARY OF THE INVENTION

With the foregoing in mind, it is an object of the present invention to provide a method of controlling a plasma arc torch in cutting or marking a workpiece in which the arc is extinguished at the precise instant the torch reaches the stopping point in its path of travel.

This object is accomplished in accordance with the present invention by determining the extinguish delay time between issuance of the order to extinguish the arc and the actual extinguishment of the arc, and issuing the extinguish order at a point in the path of travel upstream of the stopping point a distance determined by the speed of travel of the torch and the extinguish delay time. Therefore, the arc is extinguished at the precise instant the torch reaches the stopping point and voltage increase, waste of electrode material and other undesirable effects are avoided.

BRIEF DESCRIPTION OF THE DRAWINGS

The invention will be explained in more detail in the following text with reference to exemplary embodiments and associated schematic drawings, in which:

FIG. 1 is a schematic block diagram of the method of the present invention;

FIG. 2 is a schematic view illustrating an exemplary path of travel of a plasma arc cutting torch in accordance with the present invention;

FIG. 3 is an enlarged, fragmentary detail of the portion of FIG. 2 contained in the box 3 therein;

FIG. 4 is a schematic view illustrating the type of cut formed by current plasma arc torches using existing control systems; and FIG. 5 is a view similar to FIG. 4 illustrating the type of cut formed by the method of the present invention.

DETAILED DESCRIPTION OF THE ILLUSTRATED EMBODIMENTS

Referring now more specifically to the drawings and particularly to FIG. 1, there is illustrated a method in accordance with the present invention by means of a block diagram.

There are a number of different plasma arc torches to which the present invention is applicable. Since these torches are conventional and well known, such torches will not be described herein. Similarly, there are a number of different types of power supplies for plasma arc torches which are well known and conventional and therefore will not be described herein. Finally, a number of different types of mechanisms for mounting and moving plasma arc torches relative to workpieces are also well known and need not be described herein. One example of a plasma arc cutting system is disclosed in U.S. Pat. No. 5,290,995 which is incorporated herein by reference.

As is common with conventional control systems for plasma arc torches, the control system of the present invention includes a controller or microprocessor 11 which controls the movement of a torch 12 relative to a workpiece 13 in accordance with a part path program 14 and a travel speed program 15 (FIG. 1). The controller or microprocessor 11 also controls the power supplied to the plasma torch 12 from a power supply (not shown). When power is supplied, a plasma arc 16 is established between the torch 12 and the workpiece 13 to cut or mark the workpiece 13.

In accordance with the present invention, the part path program 14 includes a pre-programmed path of travel which is illustrated in FIG. 2 as a rectangular path of travel 20, but which could be of any desired shape. As illustrated, path of travel 20 includes a starting point 20a and a stopping point 20b. The part path program 14 and the basic program for operation of the torch 12 causes power to be supplied to the torch 12 when it is above the starting point 20a and an arc 16 is established between torch 12 and workpiece 13. Torch 12 is then moved along path of travel 20 to cut or mark the workpiece 13 at speeds determined by the travel speed program 15 until the torch 12 approaches the stopping point 20b.

Each particular plasma arc cutting system will have an extinguish delay time between the issuance of an arc extinguish order and the actual extinguishment of the arc. The arc extinguish delay time will vary in accordance with the type of power supply used, the particular extinguish sequence used, the logic processing time and other factors. The arc extinguish delay time for each particular plasma arc cutting system can and should be determined by experimentation taking into account all necessary parameters. Once determined, the arc extinguish delay time is programmed into the controller 11 as a machine constant.

The control system of the plasma arc torch 12 includes a plasma power supply off program 21 which causes the controller 11 to control the plasma torch 12 extinguishment sequence. The program 21 includes the arc extinguish delay time as a machine constant and supplies that information to the controller 11 at the appropriate time.

The part path program 14 includes information as to the speed or velocity of the torch 12 as it moves along the path of travel 20 and as to the location of the torch 12 relative to the stopping point 20b. The program 21 causes the controller 11 to calculate a distance upstream of the stopping point 20b based upon the speed or velocity of the torch 12, the deceleration of the torch 12 to come to a stop at the stopping point 20b and the arc extinguish delay time. As illustrated in FIG. 3, there is a series of arrows A, B, C, D and E that are spaced apart, along the path of travel 20 upstream of the stopping point 20b, distances which the torch 12 will travel in 1 millisecond. The calculated distance from stopping point 20b at which the arc extinguish order is issued may, for example, coincide to arrow C or any other location.

Once this distance is calculated, the controller 11 compares the actual location of the torch 12 along the path of travel 20 to the calculated location where the arc extinguish order should be issued. When the actual location of the torch 12 coincides with the calculated location, the controller 11 issued the arc extinguish order to shut-off the power supply to the torch 12. The power supply is shut-off and the arc 16 is extinguished instantaneously contemporaneous with the torch 12 reaching the stopping point 20b.

Referring now to FIG. 4, there is illustrated schematically the type of cut or kerf formed by plasma arc cutting torches with prior control systems. A workpiece 13a has a kerf 23 formed therein which includes a starting point 23a and an ending or stopping point 23b. The starting point 23a has a small "keyhole" which is formed because the arc is established before the torch commences its movement along its path of travel. The stopping point 23b has a larger "keyhole" because such systems wait until the torch actually stops to issue the arc extinguish order.

There is illustrated in FIG. 5 the workpiece 13 having a kerf 25 formed therein along path of travel 20. Kerf 25 has the usual small keyhole at its starting point 25a, but has no keyhole at all at the stopping point 25b because the arc 16 is extinguished at the precise instant the torch 12 arrives at the stopping point 25b.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of controlling a plasma arc torch in cutting into a work piece comprising moving the torch relative to the workpiece along a path of travel between a starting point and a stopping point in accordance with a predetermined program, and controlling the torch such that the torch is extinguished instantaneously contemporaneous with the torch reaching said stopping point including determining the arc extinguish delay time between issuance of an order to extinguish the torch and actual extinguishment of the torch.

2. A method according to claim 1 wherein controlling the torch includes determining the distance traveled by the torch during the extinguish delay time.

3. A method according to claim 2 wherein controlling the torch includes issuing an extinguish order at the precise instant the torch arrives at the point along its path of travel upstream of said stopping point the distance the torch will travel during the extinguish delay time.

4. A method of cutting a workpiece with a plasma arc torch comprising moving the torch relative to the workpiece along a path of travel between a starting point and a stopping point in accordance with a predetermined program, causing the torch to establish an arc between the torch and workpiece along the path of travel between the starting point and the stopping point to cut in lieu there of the workpiece along the path of travel, and controlling the torch such that an extinguish order is issued at a predetermined point in said path of travel spaced upstream from said stopping point a distance determined by the speed of movement of the torch along said path of travel and the extinguish delay time between issuance of the extinguish order and actual extinguishment of the arc, whereby operation of the torch ceases instantaneously contemporaneous with the torch reaching said stopping point.

5. A method according to claim 4 wherein the torch is caused to form a kerf in the workpiece to cut the workpiece along the path of travel.

6. A method according to claim 4 wherein the torch is caused to form a shallow groove in the surface of the workpiece to mark the workpiece along the path of travel.

* * * * *

UNITED STATES PATENT AND TRADEMARK OFFICE
CERTIFICATE OF CORRECTION

PATENT NO. : 5,893,986
DATED : April 13, 1999
INVENTOR(S) : Oakley et al.

It is certified that error appears in the above-identified patent and that said Letters Patent is hereby corrected as shown below:

In the title, item [54] and column 1, lines 1 and 2, after "TORCH", insert --IN CUTTING INTO A WORKPIECE--.

Column 4, line 25, "in lieu there of" should read --into--.

Signed and Sealed this

Twenty-first Day of September, 1999

*Attest:*

Q. TODD DICKINSON

*Attesting Officer*     *Acting Commissioner of Patents and Trademarks*